United States Patent [19]

Conrad et al.

[11] Patent Number: 5,222,375
[45] Date of Patent: Jun. 29, 1993

[54] ADSORPTION/HUMIDIFICATION COOLER FOR HUMID GASEOUS FLUIDS

[76] Inventors: Wayne E. Conrad, 27 King Street, Hampton, Ontario, Canada, L0B 1J0; Richard S. Phillips, 24 Devondale Street, Courtice, Ontario, Canada, L1E 1S1

[21] Appl. No.: 848,214

[22] Filed: Mar. 10, 1992

Related U.S. Application Data

[63] Continuation-in-part of Ser. No. 747,843, Aug. 20, 1991, abandoned.

[51] Int. Cl.$^5$ .............. F25B 17/06; F25B 23/00; F25B 17/08; B60H 1/32
[52] U.S. Cl. .............................. 62/271; 62/94; 62/480; 62/241; 62/244
[58] Field of Search .............. 62/271, 94, 480, 91, 62/95, 271, 480, 241, 244

[56] References Cited

U.S. PATENT DOCUMENTS

| | | | |
|---|---|---|---|
| 2,926,502 | 3/1960 | Munters et al. | 62/94 |
| 2,957,321 | 10/1960 | Munters et al. | 62/94 X |
| 2,959,930 | 11/1960 | Munters | 62/94 X |
| 3,144,901 | 8/1964 | Meek | 62/94 X |
| 3,774,374 | 11/1973 | Dufour et al. | 62/94 X |
| 3,828,528 | 8/1974 | Weil | 62/94 X |
| 4,138,861 | 2/1979 | Wurm | 62/480 |
| 4,354,358 | 10/1982 | Tatsuoka et al. | 62/271 |
| 4,523,631 | 6/1985 | McKinney | 62/238.3 X |
| 4,574,874 | 3/1986 | Duran | 62/480 X |
| 4,594,860 | 6/1986 | Coellner et al. | 62/271 |
| 4,711,097 | 12/1987 | Besik | 62/271 |
| 4,786,301 | 11/1988 | Rhodes | 62/271 |
| 4,924,676 | 5/1990 | Maier-Laxhuber et al. | 62/480 X |
| 4,952,283 | 8/1990 | Besik | 62/271 |
| 4,982,575 | 1/1991 | Besik | 62/271 |

FOREIGN PATENT DOCUMENTS

| | | | |
|---|---|---|---|
| 688082 | 6/1964 | Canada | 62/94 |
| 1261628 | 9/1989 | Canada | |

Primary Examiner—Henry A. Bennet
Assistant Examiner—Christopher Kilner

[57] ABSTRACT

A cooler for use with gaseous process fluids such as air containing a vapor has a vapor adsorption unit for passing process air through an adsorption media to dry the air, a heat exchanger to control the temperature of the heat adsorption media and process air, a vapor removal system for removing the adsorbed vapor from the adsorption media, and a humidification unit to add a vaporizable liquid to the dried process air, so as to vaporize the liquid into the dried process air. Thus, heat in the process air is utilized for the latent heat of vaporization of the liquid to reduce the temperature in such process air, while maintaining a predetermined humidity level in said air. The vaporizable liquid may be sprayed into the process fluid as a mist. Excess cooled coalesced liquid may be used in a heat exchanger to precool the process fluid before it enters the humidifier. The invention includes a method of chilling a gaseous fluid, by means of adsorption of vapor from such fluid while controlling the temperature thereof, and subsequently adding a vaporizable liquid to such dried fluid whereby to vaporize such liquid and thus cool the fluid.

16 Claims, 9 Drawing Sheets

ADSORPTION/HUMIDIFICATION COOLER FOR HUMID GASEOUS FLUIDS

RELATED APPLICATION

This application is a continuation-in-part of U.S. patent application Ser. No. 07/747,843 filed Aug. 20, 1991 in the name of Wayne E. Conrad et al, now abandoned.

FIELD OF THE INVENTION

The invention relates to a cooling apparatus, for cooling humid gaseous fluids such as air, containing a vaporized liquid, and to a method of cooling gaseous fluids by means of adsorption of such vaporised liquid and rehumidification of the gaseous fluid.

BACKGROUND OF THE INVENTION

The cooling of gaseous fluids containing humidity and, in particular, the cooling of humid air, is required in many circumstances. Cooling of ambient atmosphere is required in buildings, domestic dwellings, and in appliances such as refrigerators, and in storage rooms and the like. It is also, of course, required in vehicles such as automobiles and many delivery vehicles and trucks, and in aircraft and marine craft.

Many different proposals have been made for cooling gases and, in particular, for the cooling of air. The most popular system in widespread use is the use of the compression and expansion of a heat exchange medium in the form of a gas which can be compressed into a liquid state, and then is allowed to expand into a vapour state once more, the so-called compression/expansion cycle. In most cases, the gas used is known under the trade mark "Freon". These systems using the compression/expansion cycle require a relatively large input of power for the compression cycle. This is usually provided by a pump, and an electrical motor or other prime mover. For example, in the case of an automobile, a power takeoff is simply connected directly to the automobile engine usually by means of a belt.

In most other cases, electrical motors are used as is well known. These systems require more and more power, as the cooling load is increased. Thus, in extremely hot seasons of the year, very large amounts of electrical power are required simply to maintain a stable cool environment in office buildings and homes. Similarly, in the case of automobiles, during the summer months, it is well known that the operation of an automobile air conditioner for maintaining cool air within the automobile, places a substantial load on the engine and increases the fuel consumption considerably.

Since electrical power is generated largely by the use of fossil fuels, and since automobiles are almost entirely powered by fossil fuels, it will be appreciated that the amount of fuel expended simply to cool interior environments, during the hot weather, is very considerable. This fuel consumption can sometimes be so great as to impair the air quality of the ambient air, and can, in some cases, actually threaten the stability of the electrical power supply utility itself.

A further and more significant disadvantage of the compression expansion gas cycle heat exchanger is the fact that, as in the case of almost all mechanical devices, it eventually wears out, and the seals entrapping the gas within the closed circuit compression/ expansion loop become worn. As a result, the gas is allowed to escape into the atmosphere. It is now widely believed that the escape of such gases into the upper atmosphere of the earth is responsible for certain changes in the upper atmosphere which are likely to have long term serious and harmful effects for the entire population of the earth.

Another problem which was typically encountered in the actual operation of most air conditioner systems on the normal condition is the fact that they are operating in a relatively humid atmosphere i.e. the air is laden with water vapour. Because the air is at a relatively high temperature, in hotter seasons when air conditioning is required, while the relative humidity of the air at that temperature may not appear to be significantly high or unusual, once it is attempted to reduce the temperature of the air, the relative humidity of the colder air is proportionately increased. As a result, in most typical air conditioning systems, while the operation of the air conditioner may be effective to reduce the temperature of the air by a few degrees, it does not significantly increase the actual comfort level experienced by persons within that air conditioned environment. This is due to the fact that, as the temperature goes down, the humidity goes up, and although the air temperature is slightly less, it does not feel significantly cooler, since the humidity is noticeably higher.

In order to bring the environment down to a more reasonable comfort level it is necessary to both reduce the temperature of the air and to reduce the humidity level. However typically, in the operation of a normal air conditioner, while the air conditioner can quite readily reduce the temperature of the air a few degrees, it then reaches a level at which it must not only reduce the temperature of the air, but it must also cause actual condensation of the water vapour out of the atmosphere. As is well know, when water vapour is condensed it must give up the latent heat of condensation. This latent heat must then be disposed off by the air conditioner before the air conditioner can produce any further significant reduction in the air temperature, and comfort level, within that environment. It is of course possible to provide an air conditioner of excessively high heat transfer capacity, for a given environmental space. This will then produce a rapid dehumidification of the air. However the resultant atmosphere as experienced by persons in that environment, is found to be excessively dry. These factors are of course very well known to air conditioning engineers, and the calculation of the heat transfer capacity of an air conditioner required for a given space is generally speaking a balance or "trade off" between a somewhat under specified system, which will not produce excessive drying, but which will take a significant time to produce a drop in temperature, and an overspecified system which will result in an excessive drying of the atmosphere, but which will reduce the temperature over a shorter space of time. In practice, where it is likely that the air conditioner will be in more or less continuous 24 hour operation within a given environment, at least during hot weather, the general rule is to attempt to slightly underspecify the heat extraction capacity of the air conditioning system. This means that the air conditioner will operate in a more or less "steady state" condition, maintaining an environment at a stable temperature and at a stable humidity level.

There are however certain disadvantages in this practice. When an air conditioner is to be operated under such steady state conditions, it means that the unit will be in operation more or less continuously over a 24 hour duty cycle as long as the weather remains hot. As a result, the unit may have a somewhat shorter of a life span, or alternatively require servicing at more frequent intervals, than would be the case if a unit having a somewhat higher capacity had been specified.

Other forms of heat exchange cycle devices are used in commercial buildings. These usually simply involve water chillers, and a water circulation system whereby chilled water is pumped through the radiators in a commercial building, during the hot season. Heat exchangers and evaporators are usually located, for example, on the roof of a building. These systems while, generally speaking, being less harmful in terms of releasing gases into the atmosphere, still require the consumption of substantial amounts of electrical power in most cases.

Other systems which have been used in the past are the so-called "ammonia" cycle cooling system and also the "lithium-bromide" cooling cycle. Both of these systems also make use of the physical properties of the chemical involved, which goes through a change of state, during the cycle and thus transfers heat from an enclosed space, to some other point where it may be dissipated into the atmosphere. While these systems are somewhat less harmful than the conventional "Freon" (trade mark) cycle systems, they are also known to be somewhat less efficient and thus do not produce the same cooling efficiency, thus requiring still more fuel consumption and are consequently not as popular with consumers.

As a result, notwithstanding all of the well known disadvantages of the typical "Freon" compression expansion heat exchange cycle, the "Freon" gas heat exchanger is by far the most widely used method of heat exchange, in use at the present time.

Clearly, it is desirable to provide a heat exchange system wherein both problems are overcome. Ideally such a heat exchange system should be characterized by a complete absence of any harmful pollutants which can escape from the system and, at the same time, should use as little as possible in the way of energy input required to operate them.

Since, in many situations, heat exchangers are required where there is already an excess of "waste" heat, it is clearly desirable, if possible, that any power requirements required for the operation of such a heat exchanger shall be generated by recycling waste heat. This is particularly true, for example, in the vehicle industry. In this particular case, it is clearly desirable, as far as possible, to provide a heat exchanger which does not draw energy from the prime mover, but instead depends for its energy source on waste heat generated by the prime mover which is otherwise simply vented to atmosphere either through the exhaust system or through the engine coolant system.

In the particular case of the vehicle industry, the designing of a high efficiency heat exchanger, which does not utilize harmful pollutants, is particularly desirable for another reason. In recent years, governments, in various countries, have attempted to discourage the installation of air conditioners in automobiles. Governments have been motivated by various reasons, other than the simple extraction of tax revenues. In the first place, as explained above, such heat exchangers eventually leak and vent harmful pollutants to the atmosphere. In the second place, they cause excess consumption of fossil fuels. These cause undesirable emissions to the atmosphere and, in the case of some countries, use up precious foreign exchange resources, which would better be used for the purchasing of other forms of supplies, unobtainable in those countries.

In some countries, therefore, a special air conditioner tax has been adopted. This tax must be paid when a new vehicle is obtained incorporating air conditioning in its ventilation system.

In some countries automobile air conditioners using the "Freon" cycle system have simply been prohibited altogether, as of a certain future date.

Clearly, therefore, it is desirable from all points of view to provide a different form of air conditioning for vehicles, or for other purposes which does not offend any government regulations and does not involve or incur the payment of additional taxes.

A further factor in the design of such an improved air conditioner is that there exists a very substantial market in the vehicle industry and, in particular, in the commercial side of the vehicle industry, i.e., commercial vehicles and trucks, as well as in private automobiles, for the retrofitting of air conditioners to vehicle ventilation systems. This arises both in the case of older automobiles which have not been built with air conditioners. However, it also applies in the case of newer smaller horsepower vehicles sold at the lower end of the price range, where the air conditioner tax is a significant discouragement to the consumer and, in addition, where the operation of an air conditioner on a relatively lower horsepower vehicle would substantially interfere with its performance.

In the commercial vehicle industry on the other hand, air conditioners are often not specified in the ventilation systems due to the penalty of an increase in fuel consumption. Such commercial vehicles which are operated over many hundreds of thousands of miles a year, must be operated with a predictable rate of fuel consumption. If air conditioners are incorporated in such vehicles, and the fuel consumption increases, then it significantly interferes with the economics of the operation of such a vehicle. As a result, there has been considerable resistance to the installation of air conditioners in such commercial vehicles.

This "after market" for air conditioners which can be retrofitted into existing vehicles is very substantial. However, existing vehicle air conditioners based on the "Freon" cycle of compression and expansion cannot easily be retrofitted and, in addition, even if they are, require the payment of the air conditioner tax in those jurisdictions where it is applicable, and also reduce vehicle performance and increase fuel consumption.

Clearly, therefore, it is desirable that in the design of a new air conditioning cycle that it shall be capable of being retrofitted into vehicle ventilation systems which do not already have air conditioning systems, and that it may have such a design that it does not incur the air conditioning tax or other regulations in certain jurisdictions, and that it does not emit harmful pollutants or use fossil fuels to any extent.

It is also desirable to provide such an air conditioning unit which may be operated efficiently over a relatively wide range of variations in humidity levels of the ambient air within the environment, and which will maintain a substantially stable cool temperature, and a substantially stable relative humidity in such cool environment.

BRIEF SUMMARY OF THE INVENTION

With the view therefore to satisfying the foregoing various conflicting requirements, the invention comprises a cooler for use in association with a gaseous flow system adapted to move a gaseous process fluid such as air, containing a predetermined moisture vapour content, said cooling system comprising, moisture vapour adsorption means, and duct means for passing said process fluid through said adsorption means, whereby to dry said process fluid and substantially reduce said predetermined quantity of moisture vapour in said process fluid, first heat exchange means for maintaining the temperature of said adsorption means substantially stable, vapour removal means for removing said adsorbed vapour from said adsorption means, thereby separating said vapour from said gaseous process fluid circulating in said system, and, humidification means operable to add a vaporisable liquid to said dried process fluid, whereby to vaporise said liquid in said dried process fluid thereby utilising heat in said dried process fluid for the latent heat of vaporisation of said liquid thereby to reduce the temperature thereof and simultaneously establish a desirable humidity level in such gaseous process fluid.

The invention further comprises such a cooler system, and wherein said adsorption means comprises a first adsorption portion adapted to be placed in first gaseous duct means for adsorption of vapour from a process fluid, a second adsorption portion adapted to be placed in second gaseous duct means for removal of said vapour from said second adsorption portion, thereby sequentially adsorbing vapour from said process fluid in said first duct means, and releasing said vapour into said second duct means, whereby to regenerate said second adsorption portion for reuse while said first portion is adsorbing said vapour.

The invention further comprises such a cooler system, and wherein said cooler system is engineered to reduce the temperature of said gaseous process fluid in said circulation system from a predetermined ambient temperature, to a predetermined value reduced below said ambient temperature, and wherein said vapour adsorption step causes a slight increase in the temperature of said process fluid above said predetermined temperature, and wherein said step of re-humidifying said process fluid reduces the temperature thereof to a temperature below the temperature of said process fluid, and within a predetermined humidity range.

The invention further comprises such a cooler system and wherein vapour removed from said adsorption media is passed through a condenser, thereby to condense a substantial quantity thereof back into liquid phase, and wherein said liquid phase is then utilized for humidification of said process fluid as aforesaid.

The invention further comprises such a cooler system and wherein said adsorption means incorporates the first heat exchange means, whereby process fluid passing through said adsorption means, and being subjected to an increase in temperature due to adsorption of water vapour therefrom is simultaneously subjected to a heat exchange action, whereby to control the temperature of said adsorption media and process fluid passing therethrough.

The invention further comprises such a cooler system and wherein said vapour adsorption means comprises at least two separate adsorption units, duct means for communicating said process fluid selectively to one or other of said units, further duct means for passing air through the other of said adsorption means and venting same to atmosphere, and means for selectively changing the path of said process fluid and said air from one of said adsorption units to the other, whereby while one adsorption unit is adsorbing moisture from said process fluid the other of said adsorption units is giving up moisture to said air.

The invention further comprises such a cooler system and wherein said system is designed for use in a vehicle powered by an engine developing waste heat, and including engine heat exchanger means for collecting said waste heat from said engine, and transferring same to one of said vapour adsorption units whereby to raise the temperature thereof to vaporise moisture adsorbed therein for regeneration thereof.

The invention further comprises such a cooler system and further including ambient air radiator means connected to said vapour adsorption means, whereby to transfer heat from said adsorption means to said ambient air radiator means whereby to dissipate said heat into ambient air.

The invention further comprises such a cooler system of particular application to vehicles, such a cooler system being designed and adapted to fit on the exterior of the vehicle. In the particular case of commercial vehicles such as trucks having streamlining body portions known as "scoops" or the like, such a cooling system may be advantageously incorporated in such a scoop.

The invention also comprises such a cooler system and wherein the evaporative liquid distribution means comprises means to deliver a mist of droplets, for example a spray.

The invention also comprises such a cooler system and including second heat exchange means located upstream of the evaporative liquid distribution means, the heat exchanger having one side for flow of process fluid and the other side for flow of heat exchange fluid.

The invention further comprises a method of cooling a gaseous process fluid by means of adsorption of vapour from such process fluid whereby to dry the same, while controlling the temperature thereof, and thereafter adding a vaporisable liquid to said dried fluid whereby to vaporise said process liquid in said fluid thereby cooling the same.

The invention further comprises a method as described, and further comprising the step of simultaneously passing said gaseous process fluid through vapour adsorption means, and through heat exchanger means, whereby to simultaneously dry said process fluid, and to control the temperature both of said process fluid and of said adsorption means, whereby to procure a dried process fluid at a temperature not substantially greater than said temperature of said gaseous process fluid prior to passing through said adsorption means.

The invention further comprises such a method and wherein there are at least two adsorption portions in said adsorption means, and including the steps of simultaneously passing said gaseous process fluid through one said adsorption portion, while at the same time heating and ventilating the other of said adsorption portions, whereby to drive off adsorbed vapour therefrom whereby to regenerate the same, and thereafter reversing said step.

The invention further comprises such a method, for use in association with a vehicle powered by a prime mover, said prime mover generating waste heat, and including the step of recovering at least some of said waste heat, and supplying same to said portion of said adsorption media undergoing regeneration by heating and ventilation as aforesaid.

The invention further comprises such a method and including the step of separating said cooled process fluids stream into at least two separate streams, passing one portion of said stream through process fluid recycling means, and passing another portion of said fluid through further heat exchange means whereby to further reduce the temperature thereof.

The invention further comprises such a method and including the step of humidifying the dried gaseous fluid by a mist of water droplets in an excess amount whereby water droplets coalesce to form cooled water.

The invention further comprises such a method including the step of utilizing said cooled water to pre-cool dried process fluid prior to humidifying it.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF A PREFERRED EMBODIMENTS

It will be seen that these preferred embodiments of the invention are illustrated in the form of a heat exchange system typically for cooling a gaseous process fluid, such as air circulating in an air circulation system. It will also be appreciated that it is not a confined exclusively to cooling of such process air, but may be used for the cooling of air in an enclosed space as a stand alone unit as for example, stand alone air conditioners as are used in many locations, where air circulation systems do not already exist for circulating the air within a particular enclosure, or building, or vehicle or the like. The invention may of course be used for cooling gaseous fluids other than air, where desired.

Figure 1:
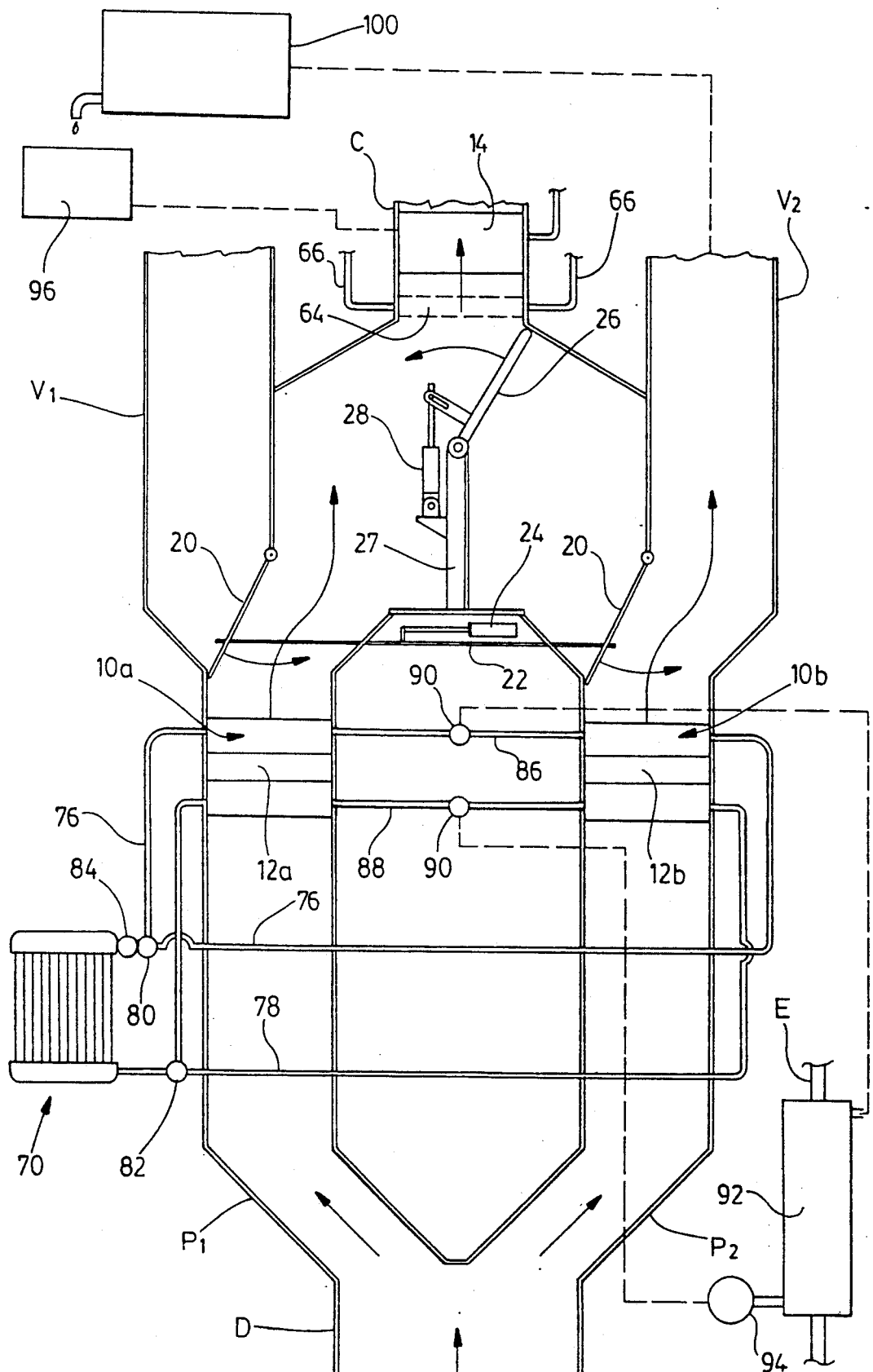
FIG. 1 is a schematic perspective illustration of the system according to the intention.

As illustrated in FIG. 1, the invention comprises in general terms vapour adsorption means indicated generally as 10a, 10b etc., adapted to be disposed in gas flow streams i.e. air, represented by the duct D and duct portions P1 and P2. It will of course be appreciated that the duct D may be part of an already installed air circulation system within a building or vehicle. It may also be part of a stand alone or free standing air conditioner unit, through which air within an enclosed environment may be circulated for purposes of cooling.

Heat exchanger means 12a, 12b, are located in the adsorption means 10a, 10b for controlling the temperature thereof.

In the embodiment as illustrated, the heat exchanger means 12 is actually incorporated in the adsorption means 10, so that the heat exchanger unit actually controls the temperature within the adsorption means itself. It will of course be appreciated that the adsorption means and the heat exchanger means can be provided as two separate units one after the other, if desired.

Downstream from the adsorption means 10 and heat exchanger means 12 is a moisture distributor means or humidifier 14, located in the dried air stream conduit represented by the reference C, where the two duct portions P1 and P2 are re-united.

It will thus be seen that the air to be chilled passes first through the vapour adsorption means 10, and through the heat exchanger means 12, in this case simultaneously with passage through the vapour adsorption means, and then through the moisture distribution or humidifier means 14.

As the gaseous fluid, i.e., air, passes through the adsorption means, moisture vapour is removed by adsorption into the adsorption media to be described below incorporated in the adsorption means 10. The gaseous fluid, in this case air, is thus substantially dried. This adsorption drying of the gaseous fluid has the effect of causing a temperature rise in the gaseous fluid. The heat thus generated is also transferred into the adsorption media, in conventional adsorption devices. It is one of the properties of most adsorption media, that as the temperature of the media rises, the efficiency of moisture adsorption is substantially reduced.

In accordance with the invention, this is avoided, by the incorporation of the heat exchanger means 12 within the adsorption means 10. The operation of the heat exchanger means 12 in a manner to be described below, controls both the temperature of the air, and of the media within the adsorption unit 10 and limits any temperature rise.

Thus air exiting from the adsorption unit 10 will be at a substantially stable temperature, or at least at a temperature elevated by only one or two degrees, above the temperature at which it entered the adsorption means.

The moisture distribution means 14 acts essentially in the manner of a humidifier, but the humidification action is such that the dried gas, for example air, is subjected to inter-mixture with particles of a liquid, for example water, which are then vaporised in the dried air stream. In so doing they take up the latent heat of vaporisation from the air stream itself and thus cool the air.

These first remarks are intended as a general description of the basic principles of operation of the invention, in order to describe in general outline the stages of the process by means of which the gaseous process fluid, in this case air, is dried and rehumidified and cooled.

It will of course be appreciated that the adsorption means has a finite capacity for adsorbing moisture, and that once that capacity is reached, substantially no more moisture will be adsorbed. At this stage it is necessary to remove the adsorbed moisture from the media by what is known as "regeneration". This involves heating and ventilating the adsorption media, so as to drive off the adsorbed moisture, and dry it out so that it is again activated for further adsorption.

Turning once again to FIG. 1, it will be seen that the adsorption means comprises a plurality of units indicated generally at 10a, 10b etc. The illustration of a plurality of such units is purely by way of explanation and without limitation. Various forms of adsorption means may be designed which will achieve the function to be described, which can also be incorporated in a single overall unit.

For the purposes of simplicity in this explanation, the air circulation system is represented generally by means of the duct D, drawing process air from for example the interior of the vehicle. Duct D, in this embodiment is shown divided into in this case two separate branch duct portions P1 and P2. The vapour adsorption means 10a, 10b are located in respective duct portions P1 and P2.

The ducts P1 and P2 in turn connect with respective vent conduits V1 and V2, and with the central cold air conduit C.

At the junctions of duct portions P1 and P2, and the vent ducts V1 and V2, there are provided a pair of swingable doors 20-20 connected by an operating rod 22. Rod 22 may be operated to and fro by means such as for example an electrical solenoid 24.

In this way one of the vent ducts V1 or V2 may be opened to its respective branch duct portion P1 or P2, and the other of the vent ducts closed to its respective duct portion, and vice versa depending upon the operation of the solenoid 24.

At the entrance to the cold air duct C, a single door 26 may be provided, at the free end of a partition wall 27. Door 26 is swingable to open conduit C to one or other of the branch duct portions P1 or P2 and close it to the other, as shown.

Any suitable power operated means may be provided for the operation of the door 26 such as the solenoid 28.

Thus while one of the duct portions P1 or P2 is connected to its respective vent duct V1 or V2 the other of the duct portions is connected to the cold air duct C.

When the two solenoids are operated, then the duct portions are connected in the reverse manner.

Figure 2:
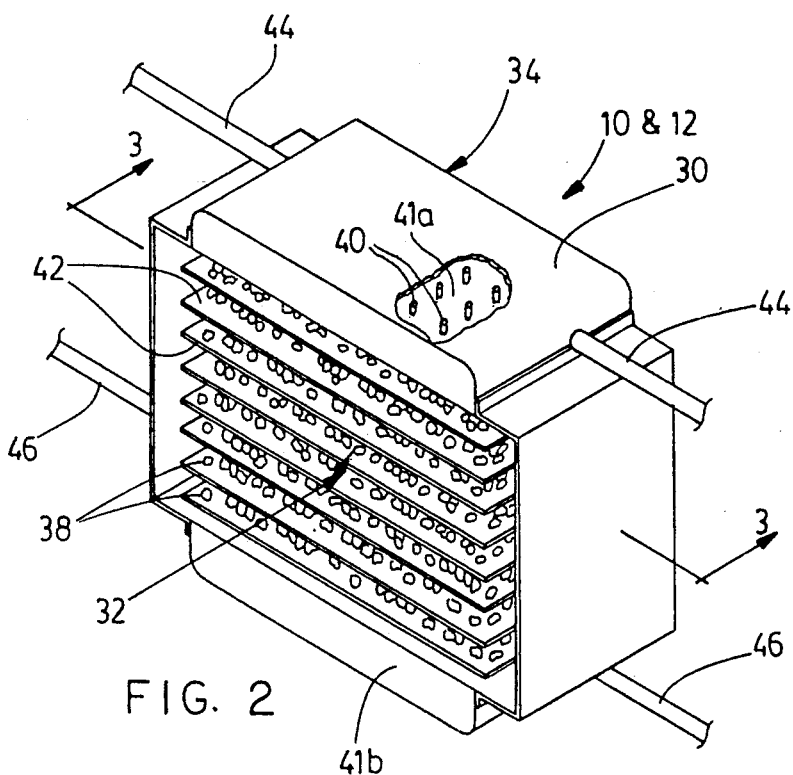
FIG. 2 is a perspective of one portion of the system illustrated in FIG. 1.

Referring now to FIG. 2, the details of a moisture adsorption means 10a or 10b (and heat exchanger means 12a, 12b) are generally illustrated. It will be seen to comprise the generally rectangular housing 30, defining front and rear openings 32-34, through which air may pass from one side to the other of the housing.

Within the housing, there is located a quantity of a moisture adsorption media 38 supported in a manner described below. Air passing through the housing, will pass over and around such adsorption media. Typically, the adsorption media will be for example silica gel. Silica gel is a material which is well known as a desiccant, and is highly effective in absorbing water vapour from an air stream. Given a suitable proportioning of the volume of silica gel to the volume of air flow and humidity anticipated during use, it is possible to engineer such a system that the moisture content or humidity of the process fluid i.e. air, flowing through the system can be reduced from an average humidity range which may be for example from 50-90% humidity, down to a relative humidity of less than 10% in many cases 2% or less.

In accordance with well understood physical principles, the removal of such water vapour from a gaseous stream by a desiccant material such as silica gel will produce a rise in the gas temperature. This is caused by the change in state of the water vapour from a vapour phase to a liquid phase as it is adsorbed by the desiccant material. During such change of state, the latent heat of vaporization must be given up, and this will cause a rise in temperature of the gas i.e., air.

Thus, the air which exits from the adsorption means 10a would be substantially completely dried, but would normally be at an elevated temperature.

Figure 3:
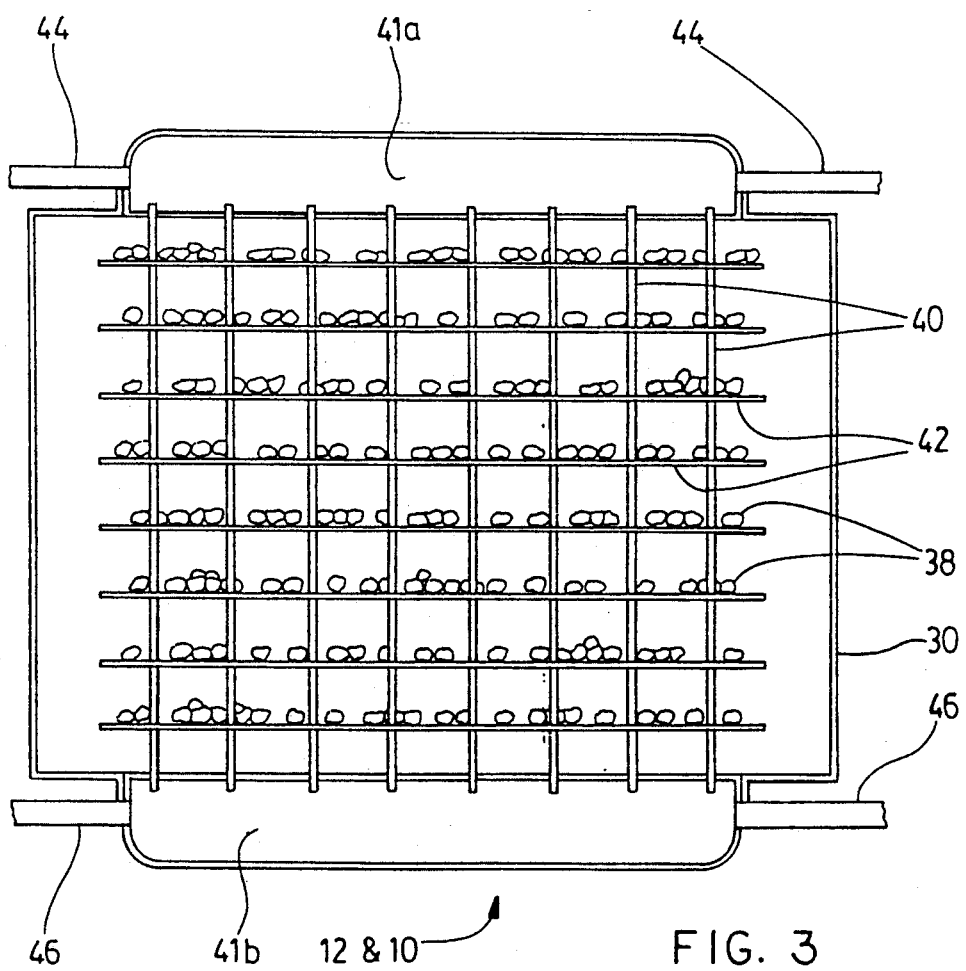
FIG. 3 is a sectional illustration along line 3—3 of FIG. 2.

However this dried hot air is simultaneously chilled by simultaneously passing through and around the chiller tubes 40. The chiller tubes 40 are in the form of a typical heat exchanger such as a radiator indicated generally in FIG. 3. As such it will be seen to comprise a plurality of tubes 40 and fins 42, and two header tanks 41a and 41b. A heat exchange fluid typically water, if necessary mixed with a suitable anti-freeze material such as ethylene glycol, is passed through the tubes 40, via headers 41a, 41b, being supplied thereto by either of pipes 44 and removed therefrom by either of pipes 46.

The particles 38 of silica gel or other desiccant material are simply supported on and between fins 42.

The heat exchange fluid will have been chilled in a manner to be described below, and passage of the heated dried air around such tubes and fins will result in the heated air and dessicant 38 giving up heat to the heat exchange fluid in the tubes 40 thereby controlling the air temperature, and at the same time controlling the temperature of the adsorption media 38.

Given suitable engineering specifications, it is entirely possible to provide for air exiting from the adsorption/heat exchanger 10, 12 which is substantially completely dry but which is at a temperature which is not significantly greater than the ambient air entering the Duct D. Thus, such air is dried in an essentially isothermic manner.

Figure 5:
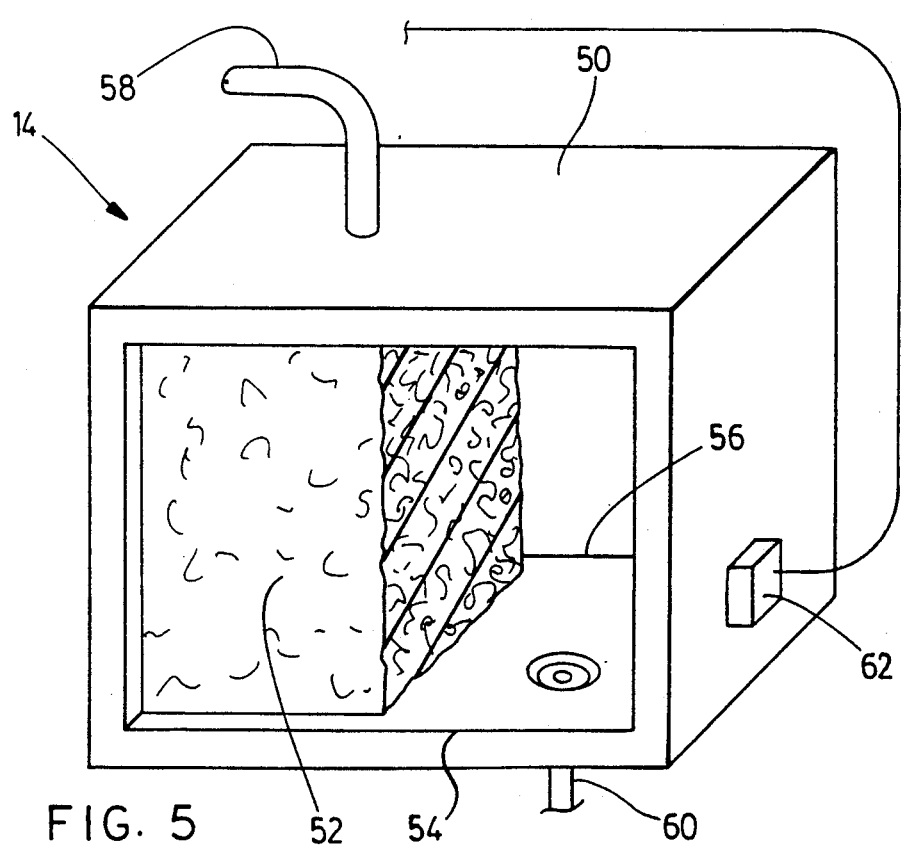
FIG. 5 is a perspective illustration of the humidification portion of the apparatus.

The dried process air is then passed through the cold air duct C, and in so doing passes through the humidifier 14. This is illustrated in more detail in FIG. 5, and comprises a housing 50, containing any suitable evaporative media such as sponge material or ceramic material or in fact a paper material coated with a plastic coating, which serves well for the purpose. This media is indicated generally as 52.

Figure 9:
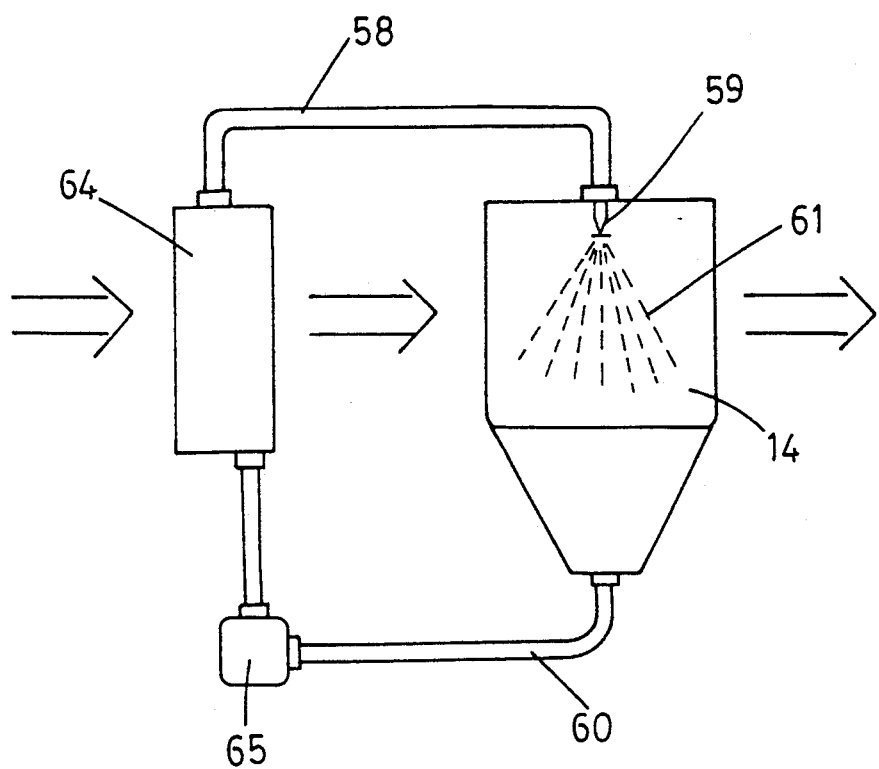
FIG. 9 is a sketch showing additional features of an alternative embodiment.
Figure 11:
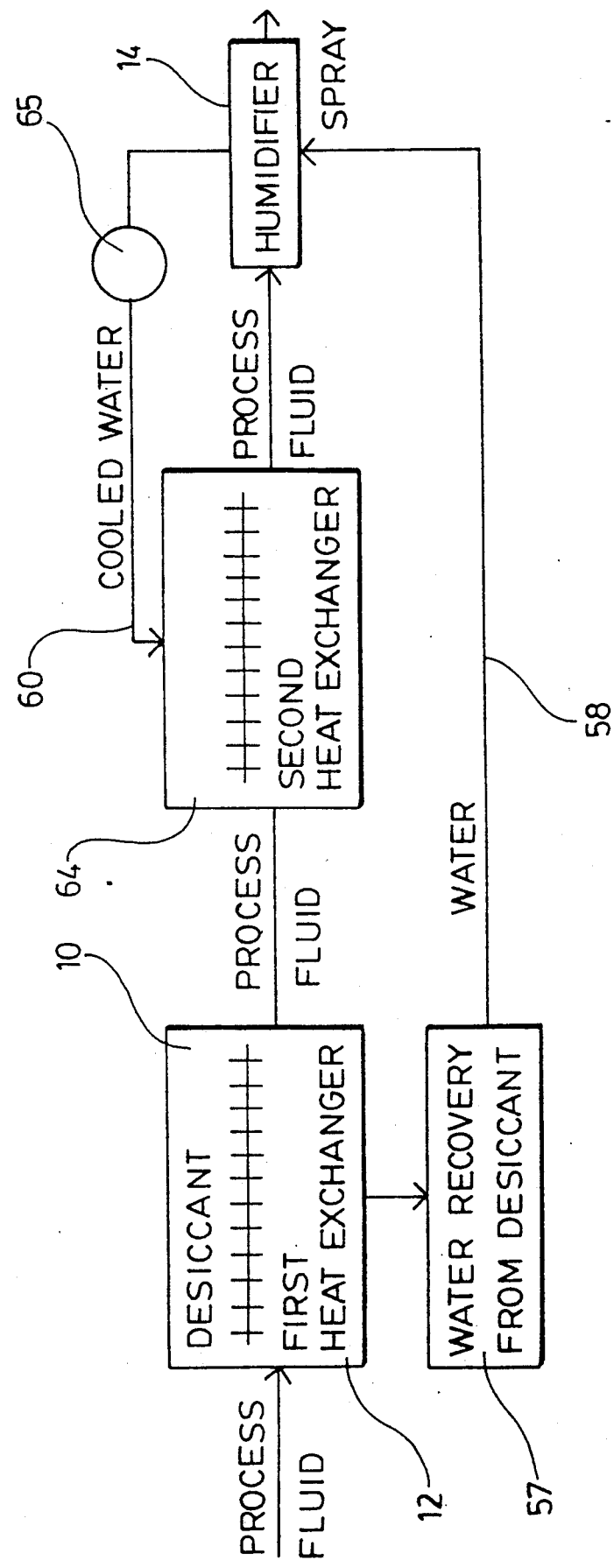
FIG. 11 is a flow diagram of the method steps of the alternative embodiment of FIG. 9.

Alternatively, as indicated in FIGS. 9 and 11, humidification may be by means of a fine spray mist of water droplets. A spray head 59 is provided in the upper part of humidifier 14 leading directly from pipe 58 carrying the liquid to be evaporated. Dried process fluid enters humidifier 14 as shown very generally by arrows in FIG. 9 and absorbs liquid from spray mist 61.

The casing 50 defines entry and exit openings 54 and 56, so that dried process air may simply pass directly through the casing 50 and through the media 52 or spray unit 61.

Vaporisable liquid, i.e., water, may be supplied via pipe 58 either for the spray head 59 (FIG. 9) or for the evaporative media, and excess water may be drained off via pipe 60. A moisture level indicator 62 may be provided, to control the flow of liquid through the casing 50.

The dried process air passing either through the media 52 or spray mist 61 from head 59 will thus pick up droplets of liquid moisture which will then vaporize, since the process air is at a humidity level which is substantially below the relative humidity prevailing in the surrounding ambient air. As the liquid water droplets vaporize, they will take up the latent heat of vaporization from the dried process air, and at the same time add moisture to the air. The air will thus have a desirable level of relative humidity, which can be controlled within reasonable limits, and at the same time, the air will be substantially cooled, thereby providing cold air passing up the duct C, for recirculation into the air conditioned space, for example within a vehicle.

When a spray mist 61 is used, excess droplets from the mist 61 are themselves cooled during this operation due to the used latent heat of evaporation as other droplets humidify the process fluid. These excess cooled droplets coalesce to form cooled liquid at the bottom of humidifier 14 which is removed by pipe 60.

If for any reason it is desired to still further reduce the temperature of the air, an air chiller indicated as 64 (FIG. 1) may be optionally added within the cold air duct C, upstream of the humidifier 14, and any suitable heat exchange medium may be passed through chiller 64 by means of pipes 66 in a manner well-known in the art. In fact, when a spray head 59 and a spray mist 61 are used, cooled water removed from humidifier 14 in pipe 60 may be pumped by pump 65 (FIG. 9)) to heat exchanger 64 to act as cooling fluid. Even when the humidifying liquid is carried on evaporative media there may be some cooling of the liquid but this is not so significant as when spray is used. Clearly, any decision as to the recycling of cooled humidifying liquid is dependent on the degree of cooling required and on the temperature of the recovered liquid.

Figure 10:
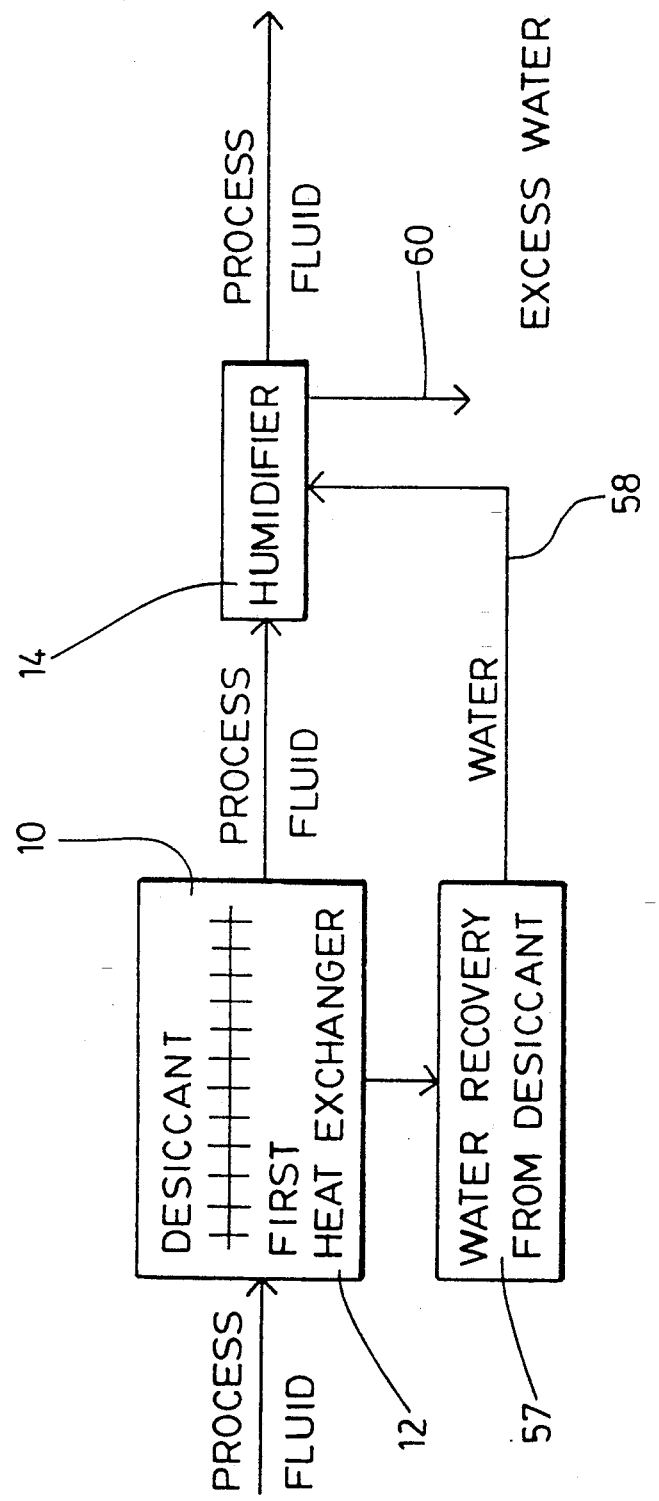
FIG. 10 is a flow diagram of the method steps in one embodiment such as that of FIG. 1.

This additional chilling step may, of course be omitted if it found to be not necessary. A comparison of the flow charts of FIGS. 10 and 11 will indicate the main method steps without the recycling of humidifier liquid to precool the process fluid (FIG. 10) and with the recycling step (FIG. 11).

Figure 4:
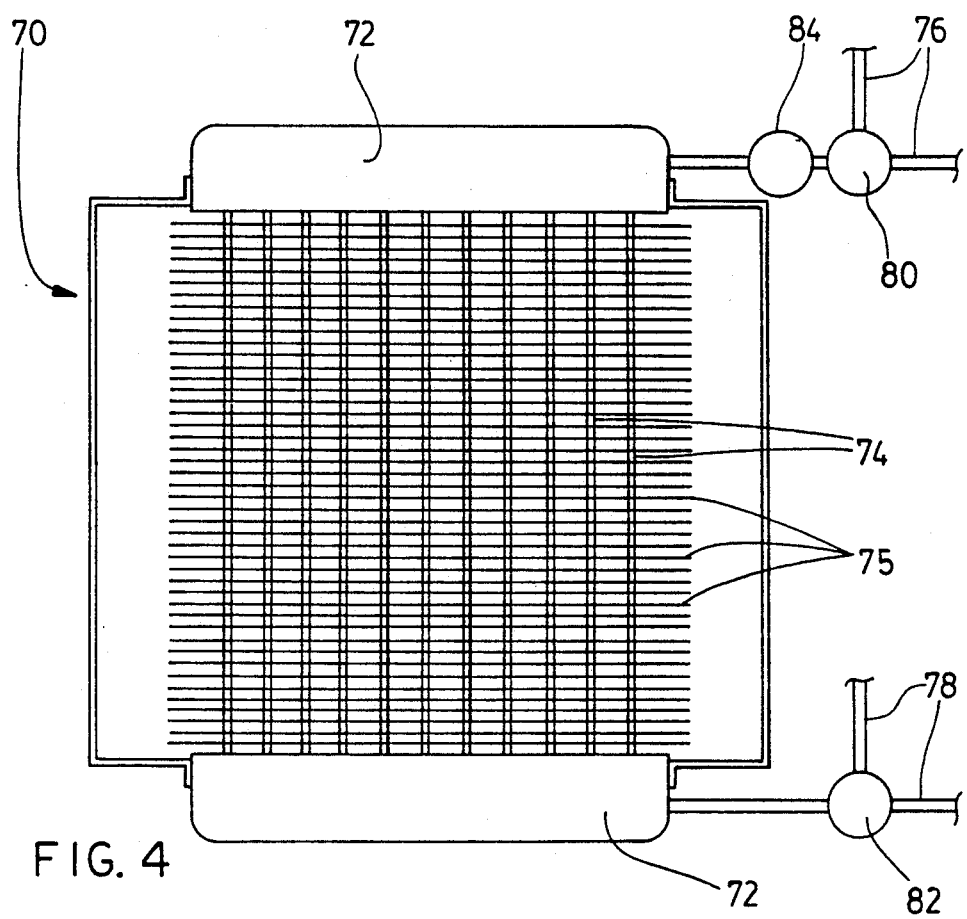
FIG. 4 is a sectional along the line 4—4 of FIG. 2.

In order to maintain the operation of the heat exchangers 12a-12b in the adsorption units 10a-10b, it is necessary that they be capable of being both supplied with hot heat exchange fluid or cooled with a cool heat exchange fluid. In order to do this, an external ambient air heat exchanger 70 (FIG. 1 and FIG. 4) is provided, having headers 72—72 and the usual tubes 74 with fins 75 of a type well known.

Heat exchanger 70 is connected to both heat exchangers 12a and 12b, by a system of inter-connectable and interchangeable conduits 76 and 78. Conduits 76 are branched at valve 80 and may be routed either to heat exchanger 12a or to heat exchanger 12b and vice versa.

Conduit 78 is branched at valve 82 and may be similarly routed either to heat exchanger 12a or to 12b and vice versa.

A pump 84 is provided to ensure circulation through one or the other of heat exchangers 12a and 12b.

Thus, by the operation of the pump 84 suitable heat exchange fluid may be simply pumped through the radiator 70 to give up its heat to ambient air, and the medium is then returned to one of the heat exchangers 12a or 12b, namely the one of the heat exchangers 12a or 12b which is in the cold process air stream. In the case of FIG. 1 as illustrated, heat exchanger 12a and adsorption unit 10a are located in the cold process air stream.

In order to supply heat for regeneration of whichever heat exchanger is in the regeneration air stream, i.e., 12b in FIG. 1, pipes 86 and 88 are provided, controlled by valves 90—90.

The heat exchanger 12b and the adsorption unit 10b (in FIG. 1) are shown located in the regeneration air stream. The heat exchanger 12b will thus receive heat exchange fluid from the heat exchanger 12a which has already been heated, due to the adsorption of water vapour in the adsorption unit 10a.

Valves 90—90 are connected to a suitable heat source 92. In the case of a vehicle, this is a simple heat exchanger coupled around the exhaust pipe, catalytic converter, or coolant system of the vehicle. Liquid is pumped by pump 94. Valves 90 will direct the heated liquid to whichever adsorption unit 10 and heat exchanger 12 is in the regeneration mode.

The heating effect of this heated heat exchange fluid in the heat exchanger 12b (FIG. 1) will thus add heat to the adsorption unit 10b, thereby ensuring the removal of water vapour for regeneration of the media.

It will be appreciated that water will have to be supplied from some suitable water tank (not shown) or from cooled excess coalesced liquid from spray mist 61 (FIG. 9) to supply water to the humidifier 14. This water may simply be a water storage tank 96, which is replenished from time to time, for example at vehicle service stations and the like.

However, in order to reduce the necessity for replenishment, a condenser 100 may be coupled to the two vent conduits V1 and V2, for condensing the water vapour back out of the air passing therethrough. The condenser may supply water tank 96 which is then connected to the humidifier 14.

In this way, the system will be essentially self-maintaining, and will require only a minimum of topping up of additional water from time to time.

Figure 6:
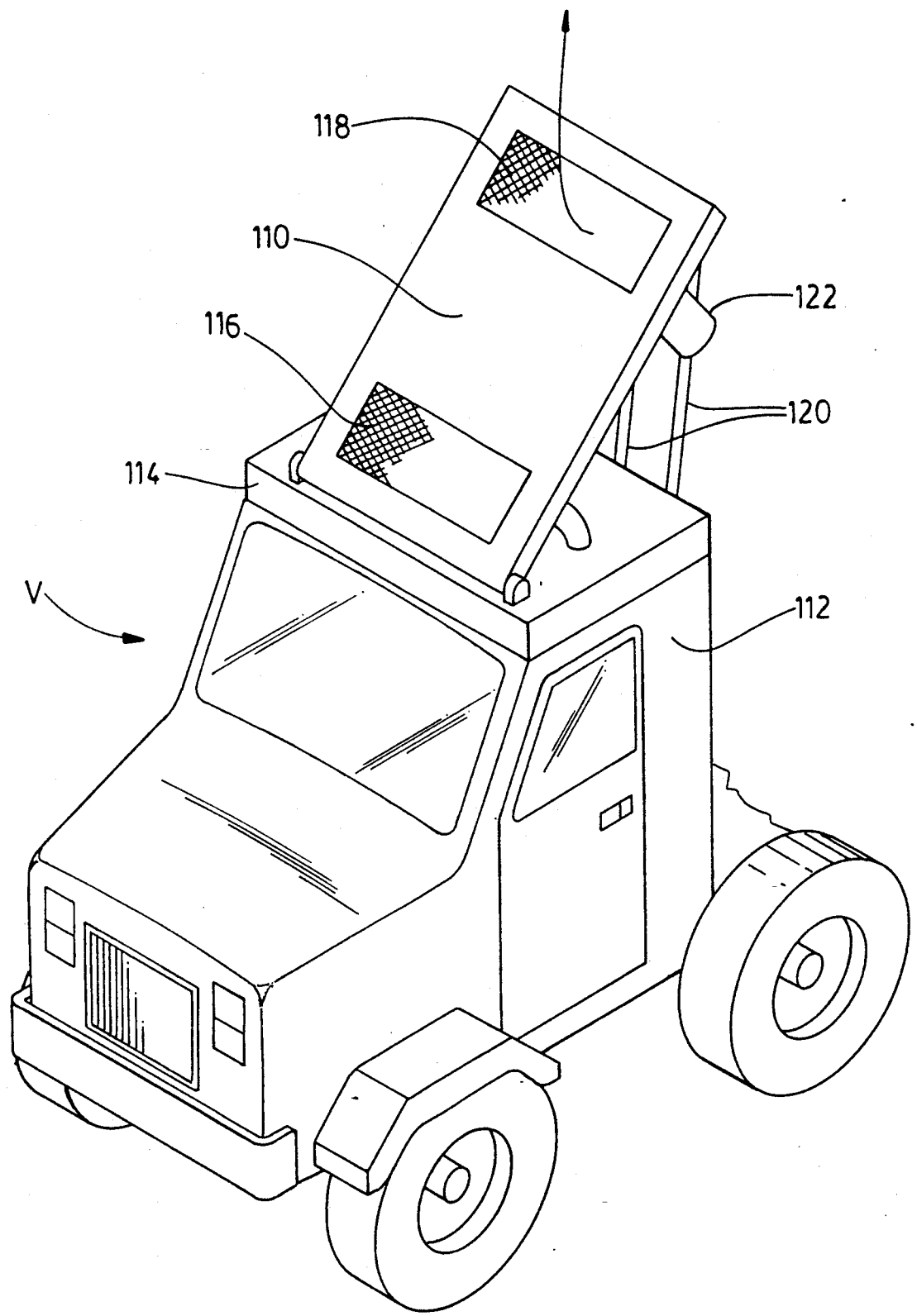
FIG. 6 is a perspective illustration of the application of the invention to a typical commercial vehicle.

In accordance with a particularly useful embodiment of the invention, the invention may be applied to a commercial vehicle indicated generally as V (FIG. 6). Such a vehicle typically represents the tractor portion of a tractor-trailer combination such as is well-known for hauling loads of long distance freight.

As is well known, such tractor-trailers typically incorporate a spoiler or scoop indicated as 110, located on top of the cab 112. This produces greater aerodynamic efficiency, and reduces fuel consumption.

In addition however it provides a particularly advantageous air flow stream for the efficient operation of the present invention.

For this purpose, the entire air cooling unit in accordance with the invention may be contained in a generally flat housing 114 located on the roof of a cab 112.

At the lower end of the scoop 110, an air intake 116 may be provided, connected to supply fresh process air for cooling and passage into the cab 112.

A heat exchanger 118, corresponding for example to the heat exchanger 70 of the embodiment FIG. 1, may be located at the upper end of the scoop connected to the heat exchanger module 114 by means of conduits 120.

In order to ensure efficient operation while stationary, or moving slowly, a fan 122 may be coupled with heat exchanger 118, and operated intermittently when required.

In this way, a highly efficient air flow stream is maintained both into the vehicle, and through the heat exchanger for rejecting heat extracted from the cab of the vehicle.

At the same time, it becomes possible to locate the entire heat exchanger unit in the most advantageous location that is to say on top of the cab of the vehicle. In this location, the cool air produced in the unit 114 will naturally tend to flow downwardly within the cab, while the hot air within the cab will naturally tend to circulate upwardly, thus requiring a minimum of supplemental flow by means of the requiring the operation of fans as air movers and the like.

In addition, the location of the entire heat exchanger unit 114 on top of the cab acts as a thermal insulation layer or barrier on top of the cab, impeding the passage of the suns rays directly into the cab, and thereby reducing the heat gain experienced in the cab.

Figure 7:
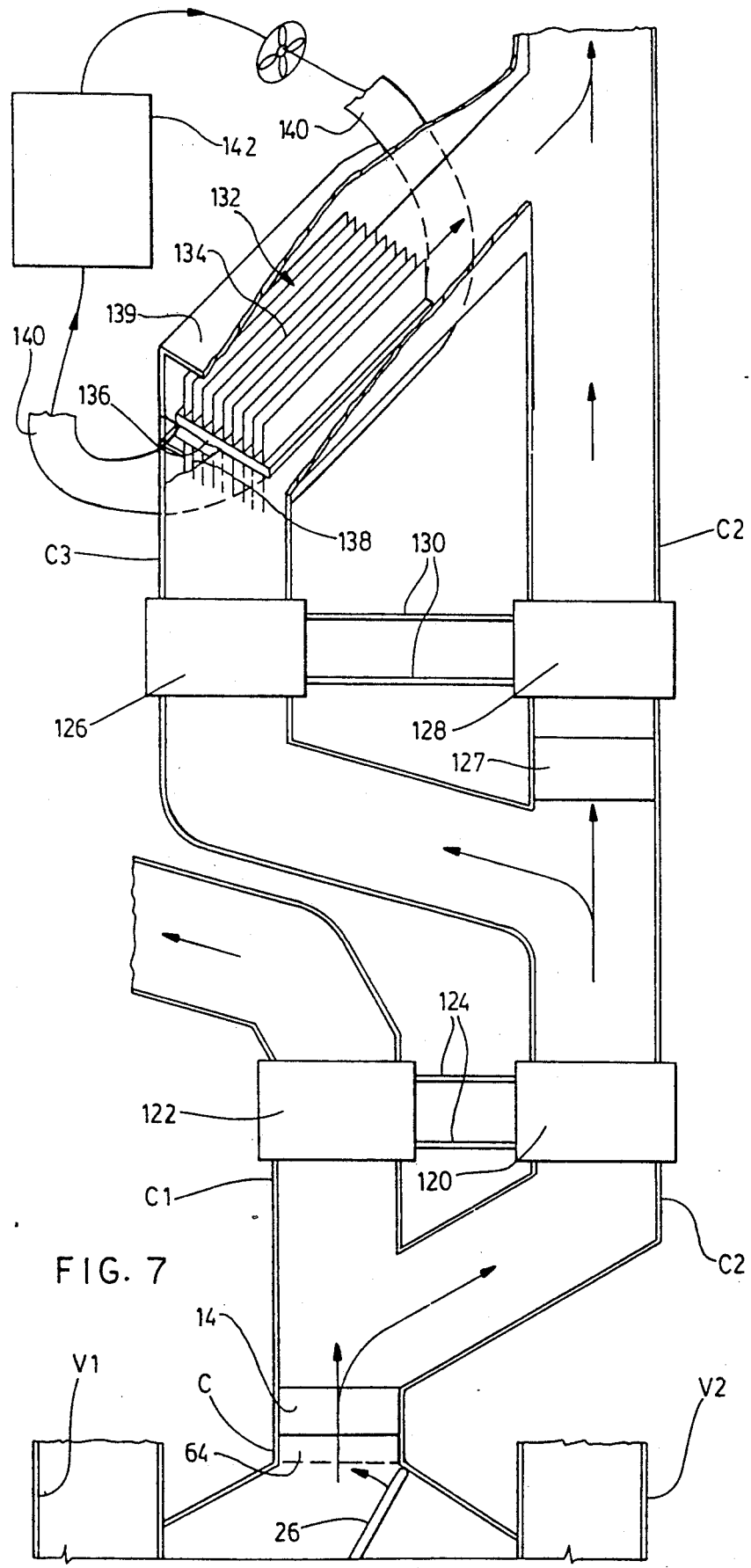
FIG. 7 is schematic illustration of a further embodiment of the invention, providing for three simultaneous different modes of operation namely cooling of a first volume of air for air conditioning, refrigeration a smaller volume of air, and a still smaller volume of air for freezing.

In accordance with the still further embodiment of the invention as illustrated in FIG. 7, the invention may in fact be employed to produce two or even three separate cooling effects namely:

1. Air conditioning for personal comfort within a space, such as a vehicle cab;
2. Chilled air for refrigeration of a storage space requiring refrigeration;
3. Actual freezer temperature air, for a more confined space, for example a compartment within a vehicle, required to be maintained at freezing temperatures, for products which have to be permanently frozen, until ready for use.

As illustrated in FIG. 7, in this embodiment the cold air duct C is divided, into a cold process air supply C1, and a refrigeration air supply C2.

Air in the duct C1 is simply returned to the cab or other portion of the vehicle, in a vehicle mounted unit, or may be simply used in a dwelling or other space, where air conditioning is required.

The portion of the air passing up the duct C2 passes to a further heat exchanger 120, which is in turn coupled to a heat exchanger 122 located in the duct C1.

Two heat exchangers are connected by pipes 124.

In this way, the air in the duct C2 is still further chilled, while the air in the duct C1 is somewhat elevated in temperature.

The air in the duct C2 may thus be taken down from a temperature in the region of for example 55 degrees down to typical refrigeration temperatures in the region of 40 degrees Fahrenheit. A second humidifier 127 is located in duct C2 to further reduce the temperature of that portion of the air stream.

The duct C2 is itself divided, so that a portion of its air flow is taken off through the duct C3 for actual chilling of a freezer compartment. A heat exchanger 126 in the duct C3 is provided to further chill the air portion in that duct, and a heat exchanger 128 is provided in the duct C2 and is connected to heat exchanger 126 by pipes 130. In this way the air in the duct C3 may be reduced in temperature to below 30 degrees Fahrenheit, while the air in the duct C2 may be somewhat elevated.

By suitably sizing the air flow capacities of the system and the heat transfer capabilities of the various air conditioners, adequate air conditioning, and adequate refrigeration can be achieved, and adequate air can be supplied for refrigeration of a freezing chamber.

In order to reach still lower temperatures for solid freezing of products over extended periods of time an additional chiller heat exchanger 132 may be provided in duct C3. Chiller 132 consists of a plurality of heat exchange fins 134 mounted in a block 136. A plurality of heat exchange fins 138 are located on the opposite side of the block 136.

The fins 134 are located within a chamber 139, which is supplied with a mixture of water, together with a freezing solution such as salt, or any other material capable of reducing the freezing temperature of water substantially.

This will have the effect of causing the already cold air flowing in duct C3, to vaporize the freezing mixture in chamber 139. In so doing, it will extract the latent heat of vaporization of such water from fins 134. Since the dew point of the water in such a freezing mixture is greatly reduced below that of plain water, it will be appreciated that the effect of such a freezing mixture chamber will be to produce a substantially greater chilling effect on the fins.

This in turn will cause fins 138, outside chamber 139 to extract heat from their surroundings. Such fins 138 are located in chamber and duct system 140 connected to a freezer chamber 142, to produce solid freezing temperatures.

The operation of the method of the invention is self-evident from the foregoing description of the apparatus, and therefore description of the specific method steps is believed to be superfluous.

Figure 8:
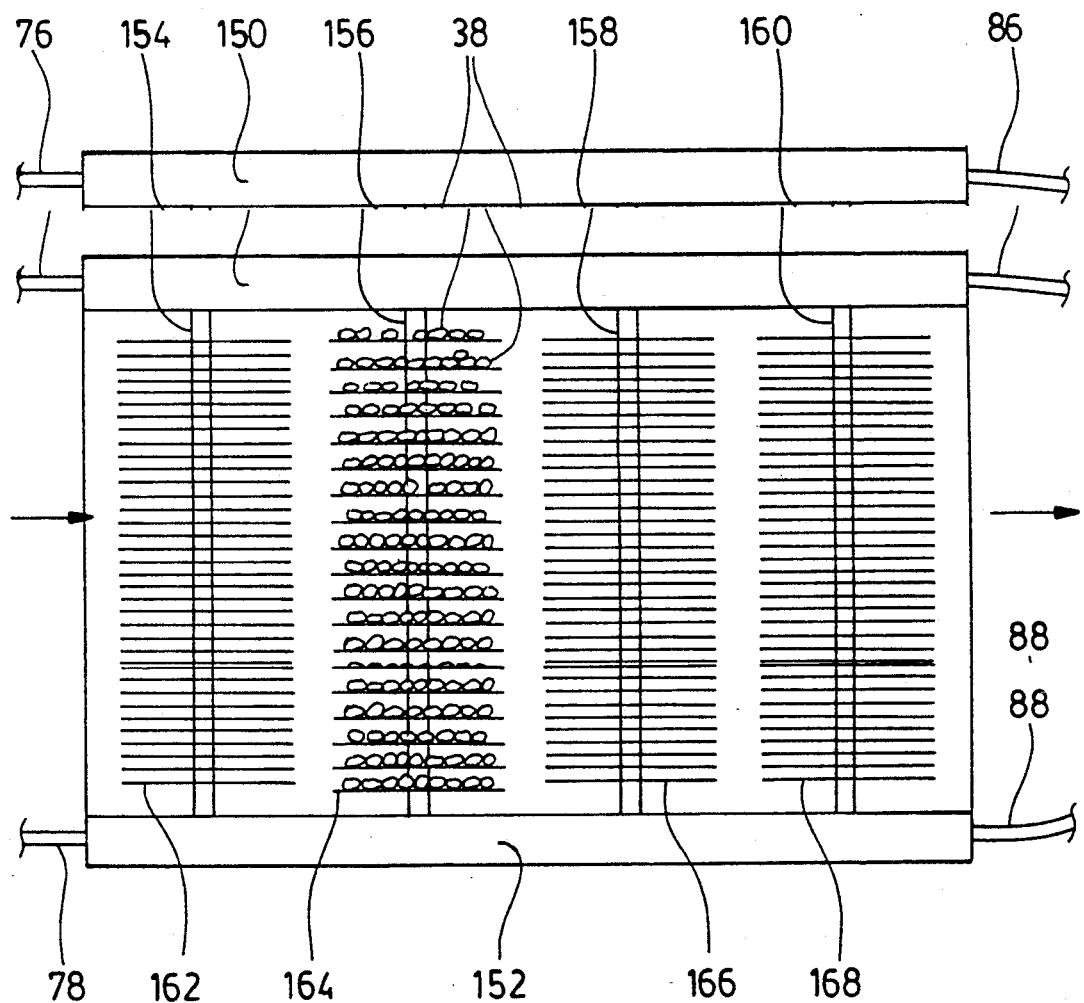
FIG. 8 is a schematic sectional view of a further embodiment of the adsorption/heat exchanger.

In accordance with a further embodiment of the invention, the adsorption unit 10 and the heat exchanger 12 may be combined in a composite unit as illustrated in FIG. 8.

As illustrated in FIG. 8, such a combined unit 10-12 comprises what is in effect a multiple bank radiator structure.

It comprises a pair of headers 150-152, adapted to be connected between pipes 76, 78, 84-84 as illustrated in FIG. 1, in each of duct portions P1 and P2.

Between the two headers, a plurality of in this case four banks of radiator tubes 154, 156, 158, and 160 are provided.

On the tubes 154, a large plurality of fins 162 are provided in a high density configuration. This may vary from application to application but for example in this particular case 22 fins to the inch is regarded as high density, and has been found to be satisfactory.

On the tubes 156, fins 164 are provided in a low density configuration. Again, this may vary but in this particular embodiment approximately 5 fins to the inch have been found to be satisfactory.

The desiccant material or silica gel 38 is packed densely between the fins 164 on the tubes 156.

On the tubes 158 and 160, fins 166 and 168 are provided in a high density configuration again, in this case being typically around 22 fins per inch.

Since all of the tubes are connected to the same headers, they will all receive either coolant in the one mode i.e. in the air drying mode and heated fluid in the other mode i.e. the desiccant regeneration mode.

Assuming the FIG. 8 embodiment is being used in the desiccant mode as shown in FIG. 1 at 10a and 12a, then coolant liquid will be received from the heat exchanger 70, and passed through the headers. Such coolant liquid will pass through all of the tubes. The first bank of fins and tubes will have little if any cooling effect on process air passing through the duct P1. The air as it passes through the second bank of tubes, with the low density fins supporting the desiccant 38, will be substantially dried, and at the same time heat will be imparted both to the desiccant material 38 and also to the air. The majority of this heat will be transferred through the fins to the tubes, and will thus be carried away by the coolant liquid flowing through the tubes.

In the event that any residual excess heat remains in the air after it has passed through the second bank of tubes, its passage through the third and fourth banks of tubes with high density fins, also being cooled by the coolant, will remove any residual excess heat, thereby ensuring that the dried process air exiting from the unit is at or close to the same temperature at which it entered.

This procedure will also ensure that the desiccant material 38 remains at a controlled temperature and thereby maintains its efficiency in the adsorption of water vapour from the air.

The foregoing is a description of a preferred embodiment of the invention which is given here by way of example only. The invention is not to be taken as limited to any of the specific features as described, but comprehends all such variations thereof as come within the scope of the appended claims.

We claim:

1. A cooling system for use in association with a gaseous fluid flow system adapted to move a gaseous process fluid such as air, containing a predetermined moisture vapour content, said cooing system comprising:
   process air duct means for supplying process air to said cooling system;
   two branch duct portions connecting with said duct means, and flow control means whereby to direct air flowing in said process air duct means into a selected one of said branch duct portions;
   two moisture vapour adsorption units each containing an adsorption media, one said unit being located in each said branch duct portion;
   means for passing said process fluid through one said adsorption unit, whereby to dry said gaseous fluid and substantially reduce said predetermined quantity of moisture vapour in said gaseous fluid;
   heat exchanger means incorporated in each said moisture adsorption unit;
   means for supplying a cool heat exchange media to said heat exchanger means in said one moisture adsorption unit, whereby to simultaneously control the temperature both of said adsorption media in said one adsorption unit, and also of said gaseous process fluid passing therethrough;
   means for supplying a heated heat exchange medium to said heat exchange means in said other of said adsorption units for removing said adsorbed vapour from said other of said adsorption units;
   humidification means operable to add a vaporisable liquid to said dried gaseous process fluid, whereby to vaporise said liquid in said dried fluid thereby utilizing heat in said fluid for the latent heat of vaporisation of said liquid thereby to reduce the temperature of said dried gaseous process fluid and simultaneously establish a desirable humidity level in such fluid, and,
   means for discharging said absorbed vapour from said other of said adsorption units.

2. A cooling system as claimed in claim 1 wherein said discharged portion of said gaseous fluid containing vapour removed from said other of said adsorption media is passed through a condenser, thereby to condense a substantial quantity of said vapour back into liquid phase, and wherein said liquid phase is then utilized to raise the vapour content of said dried process fluid as aforesaid.

3. A cooling system as claimed in claim 1 and including means for selectively changing the path of said process fluid and said air from one of said absorption units to the other, whereby while one said adsorption unit is adsorbing moisture from said process fluid, the other of said adsorption units is releasing moisture.

4. A cooling system as claimed in claim 1 wherein said system is designed for use in a vehicle powered by an engine developing waste heat, and including heat exchanger means for collecting said waste heat from said engine, and transferring same to a selected one of said vapour absorption units whereby to raise the temperature thereof to release moisture adsorbed therein.

5. A cooling system as claimed in claim 4 and further including ambient air radiator means connected to said vapour absorption units, whereby to transfer heat from the other of said adsorption means to said radiator means whereby to dissipate said heat into ambient air.

6. A cooling system as claimed in claim 1 wherein the evaporitative liquid distribution means comprises means to deliver a mist of droplets.

7. A cooling system as claimed in claim 6 including second heat exchange means located upstream of said evaporative liquid distribution means and having one side for dried gaseous fluid and another side for cooling heat exchange fluid, and including means to recycle liquid coalescing from said mist of droplets as cooling heat exchange fluid.

8. A method of cooling a gaseous fluid containing moisture vapour and comprising the steps of:
   passing said gaseous fluid around first vapour adsorption means to dry the same;
   simultaneously cooling said first adsorption means whereby to control the temperature of said dried gaseous fluid and to procure substantially isothermic drying of said gaseous fluid;
   simultaneously regenerating a second vapour adsorption means, and continuously transferring heat from said first adsorption means to said second adsorption means;
   terminating flow of said gaseous fluid to said first adsorption means, and simultaneously causing flow of said gaseous fluid to said second adsorption means, and simultaneously reversing flow of said heat exchange media, whereby to cool said second absorption means, and simultaneously heat said first adsorption means, and,
   humidifying said dried gaseous fluid with a fluid whereby latent heat of vaporisation of said liquid is utilised from said dried gaseous fluid, thereby reducing the temperature of said rehumidified process gaseous fluid.

9. A method as claimed in claim 8 wherein there are at least two said adsorption means, and including the steps of simultaneously passing said gaseous process fluid through one said adsorption means, while at the same time heating and ventilating the other of said adsorption portions, whereby to drive off adsorbed vapour therefrom whereby to regenerate the same, and thereafter reversing said steps.

10. A method as claimed in claim 9 for use in association with a vehicle powered by a prime mover, said prime mover generating waste heat, and including the step of recovering at least some of said waste heat from said engine, and supplying same to said one of said adsorption media undergoing regeneration by heating and ventilation as aforesaid.

11. A method as claimed in claim 8 and including the step of separating said cooled gaseous fluid stream into at least two separate stream portions, passing one said portion of said stream through gaseous fluid recycling means, and passing another said portion of said fluid through further heat exchange means whereby to further reduce the temperature thereof.

12. A method as claimed in claim 8 wherein said dried gaseous fluid is humidified by a mist of liquid droplets in an excess amount, whereby excess droplets coalesce as cooled liquid.

13. A method as claimed in claim 12 wherein said cooled liquid is utilized to precool dried gaseous fluid prior to humidifying it.

14. A cooling system as claimed in claim 1, for use in association with a vehicle powered by a prime mover, said prime mover being located in an engine compartment, separated from the interior of said vehicle, and wherein said moisture vapour adsorption units are located in said engine compartment, and wherein said means for supplying a heated heat exchange medium are located in said engine compartment.

15. A cooling system as claimed in claim 5, and wherein said cooling system is associated with a vehicle having a cab portion, and wherein at least said radiator means is located substantially above said cab portion.

16. A cooling system as claimed in claim 5, and wherein said vehicle has an air baffle member mounted above said cab portion, and wherein said radiator means is located in said air baffle member.

* * * * *